United States Patent [19]
Ito

[11] 4,391,133
[45] Jul. 5, 1983

[54] METHOD AND APPARATUS FOR MEASURING AN INJECTION AMOUNT FROM AN INJECTION DEVICE FOR USE WITH AN ENGINE

[75] Inventor: Shinzo Ito, Aichi, Japan

[73] Assignee: Nippondenso Co., Ltd., Kariya, Japan

[21] Appl. No.: 267,607

[22] Filed: May 27, 1981

[30] Foreign Application Priority Data

Mar. 30, 1979 [JP] Japan .................................. 54-38658

[51] Int. Cl.$^3$ .............................................. G01M 15/00
[52] U.S. Cl. ..................................... 73/119 A; 73/1 H
[58] Field of Search .......................... 73/119 A, 1 H, 3

[56] References Cited

U.S. PATENT DOCUMENTS 4,088,012 5/1978 Emerson ........................... 73/119 A

OTHER PUBLICATIONS

Beardsley, E. G. The N.A.C.A. Photographic . . . Researches, National Advisory Committee for Aeronautics Report No. 274, 1927, pp. 361-372.

*Primary Examiner*—Jerry W. Myracle
*Attorney, Agent, or Firm*—Cushman, Darby & Cushman

[57] ABSTRACT

There are disclosed a method and an apparatus for measuring an injection amount per injecting from an injection device for use with an internal combustion engine. According to the invention, pressure within an injection chamber for measurement is preliminarily raised to predetermined pressure before injecting of the injection device, and then fuel oil is injected from the injection device into the injection chamber with the raised pressure. An increase of a volume of fuel oil within the injection chamber causes displacement of a piston of a displacement member. By using an amount of displacement of the piston, an injection amount of fuel oil from the injection device per injecting can be measured with high accuracy by reducing a measurement error due to a compressed volume resulting from the pressure increase.

4 Claims, 6 Drawing Figures

METHOD AND APPARATUS FOR MEASURING AN INJECTION AMOUNT FROM AN INJECTION DEVICE FOR USE WITH AN ENGINE

BACKGROUND OF THE INVENTION

1. Field of the Invention

The present invention relates to an internal combustion engine and more particularly to a method well adaptable for measuring an injection amount from an injection pump which is used for fuel oil injection into a Diesel engine and an apparatus for executing it, which are used for adjusting and inspecting the injection pump in its manufacturing factories, for example.

2. Description of the Prior Art

In this type of the injection amount measuring method, fuel oil is injected into an injection chamber through a nozzle of an injection pump to be measured. By the fuel oil injected, a piston is pushed to displace. A displacement of the piston is converted into an electrical signal by a displacement detector mainly including a differential transformer. The electrical signal is inputted into an arithmetic unit. The arithmetic unit is arranged to set the electrical signal from the displacement detector before the injecting of the injection pump at zero as a reference, and then an electrical signal from the displacement detector after the injecting is converted into an injection amount of fuel oil. Finally, the injection amount of fuel oil is visually displayed.

According to the present inventor's study of the prior art measuring method, it has been found that for the following reason the injection amount measurement with high accuracy is unfeasible by the prior art method. In the prior art measuring method, a difference between the pressure within the injection chamber before the injecting and the pressure after the injecting is too large (e.g. 7 $Kg/cm^2$). Therefore, an increase of the volume resulting from the injecting in the injection chamber is reduced by the amount corresponding to an amount of a compressed volume as a result of the pressure difference. Therefore, the prior art method measures the injection amount smaller than an actual injection amount by the reduced amount of the volume increase. Particularly within the injection chamber, a small amount of gas as well as the fuel oil is present, the former being mixed into the fuel oil. Since a volume of the gas is inversely proportional to pressure, the compressed volume as a result of the pressure increase is also large. For example, when the volume in the injection chamber is 400 $mm^3$, it reaches even 2 to 6 $mm^3$ of the compressed volumes of the gas and the fuel oil. The prior art method measures the injection amount reduced by the compressed volume, thus making it difficult to measure the injection amount with high accuracy.

SUMMARY OF THE INVENTION

Accordingly, an object of the present invention is to provide a method of measuring an injection amount per injecting with high accuracy and an apparatus for executing it.

In one of the features of the present invention, before injecting of an injection device under measurement, pressure within an injection chamber is previously raised to given pressure. Then, a liquid such as fuel oil is injected from the injection device into the injection chamber having the pressure raised. By an increase of a volume within the injection chamber caused by the injecting, a displacement member causes displacement of its piston and an injection amount is measured by using an amount of displacement of the piston, thereby to reduce a measuring error due to a compressed volume caused by the pressure increase.

Other objects and advantages of the invention will become apparent from the following discussion of the accompanying drawings, wherein:

DESCRIPTION OF THE PREFERRED EMBODIMENTS

Figure 1:
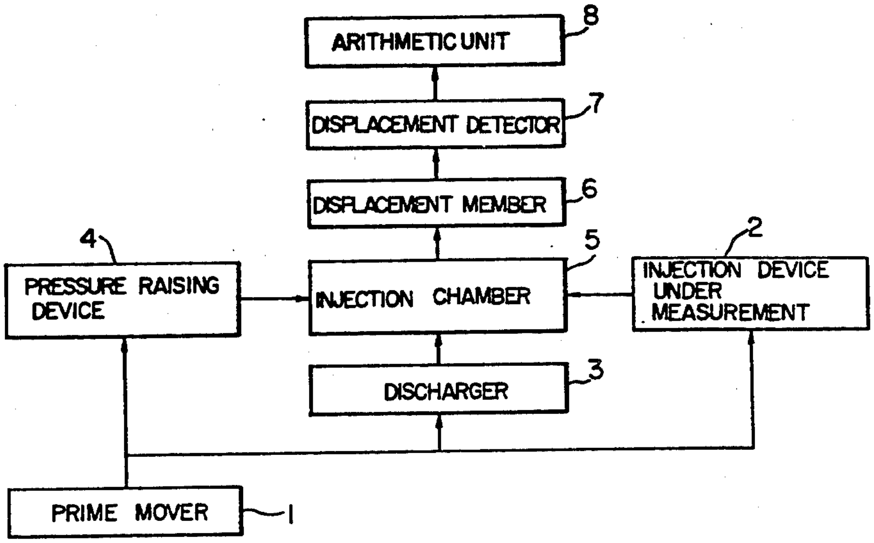
FIG. 1 is a block diagram illustrating an overall construction of an apparatus for measuring an injection amount from an injection device according to the invention.

The present invention will be described in detail using embodiments thereof. FIG. 1 is a schematic block diagram of an overall arrangement of an apparatus for executing a method of measuring an injection amount of fuel oil according to the invention. Referring to FIG. 1, a prime mover 1 comprising a motor, 2 an injection device under measurement, 3 a discharger, and 4 a pressure raising device. In the figure, reference numeral 5 is an injection chamber for measurement; 6 a displacement member which causes displacement of its piston in accordance with a change in volume of the injection chamber 5; 8 an arithmetic unit for arithmetically processing an electrical output from a displacement detector 7 to an injection amount of fuel oil and to display the injection amount of fuel oil.

Figure 2:
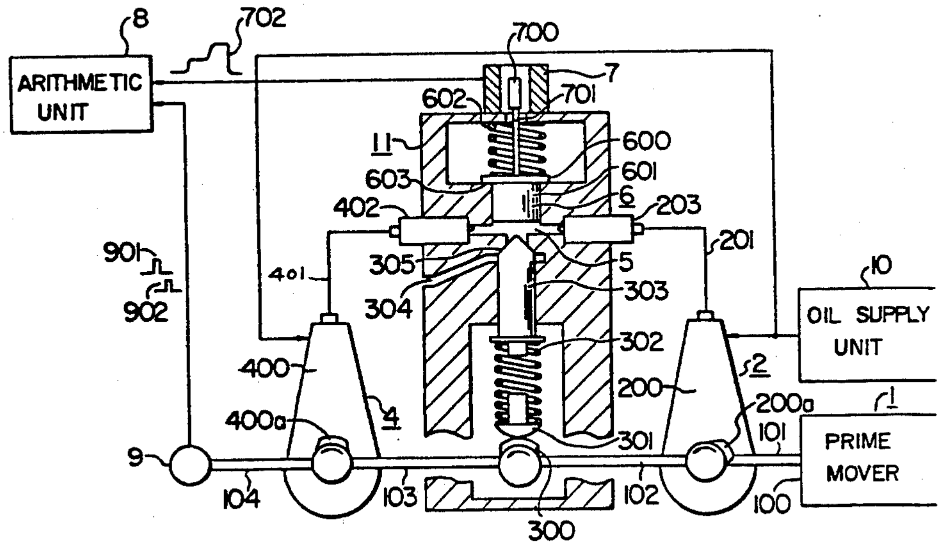
FIG. 2 is a cross sectional view of a major portion illustrating an embodiment of the apparatus for measuring an injection amount from an injection device according to the invention.

FIG. 2 is a cross sectional view of an embodiment of an apparatus for measuring the injection amount according to the invention, illustrating a detailed construction of the apparatus shown in FIG. 1. In FIG. 2, a prime mover 1 is comprised of a motor 100 and shafts 101, 102, 103, and 104. The injection device has an injection pump under measurement 200 used as a fuel injection pump for a Diesel engine, an injection pipe 201, and an injection nozzle 203 for injecting fuel oil into the injection chamber 5. The measured injection pump 200 is operated by a cam 200*a* rotating with the shafts 101 to 104. The discharger 3 is comprised of a tappet 301 which slides on a cam 300, a spring 302 which holds the tappet 301 with pressure, a valve 303, an oil discharger path 304 opened and closed by the valve 303, and a valve seat 305 on which the valve 303 seats. The injection pump 200 injects fuel oil in the injection chamber 5 outside through the oil discharge path 304. The pressure raising device 4 includes an injection pump 400, a discharge pipe 401, and an injection nozzle 402 for injecting fuel oil into the injection chamber 5. The injection pump 400 is operated by a cam 400a rotating with the shafts 101 to 104. The displacement member 6 has a piston 601 with a step stopper 600, which is pressed down, as viewed in the drawing, by a spring 602, thereby to make the step stopper 600 abut on an end face of a hole for slidably receiving the displacement member 6. The displacement detector 7 has a differential transformer for generating an electrical signal (voltage) in accordance with a position of a movable core 700 which is coupled with the piston 601 by means of a shaft 701. The arithmetic unit 8 receives the electrical signal from the displacement detector 7, that is, an electrical signal 701 representing an amount of displacement of the piston 601 of the displacement member 6, and pulse signals 901, 902 generated at given rotating positions A and B of the shafts 101 to 104 by the rotary pulse generator 9, and then performs a given arithmetic operation to measure an injection amount of fuel oil in digital fashion and to display the result. Any known pulse generator of this type may be used for the rotary pulse generator 9. The pulse signals may also be generated, for example, by an optical method in which light is intermittently applied to a photoelectric element by a slitted disc rotating with the shafts 101 to 104. Reference numeral 10 is an oil supply unit for supplying fuel oil to the injection pumps 200 and 400. Reference numeral 11 designates a body of a measuring apparatus which houses the injection chamber 5 and the respective apparatuses as mentioned above.

Figure 3:
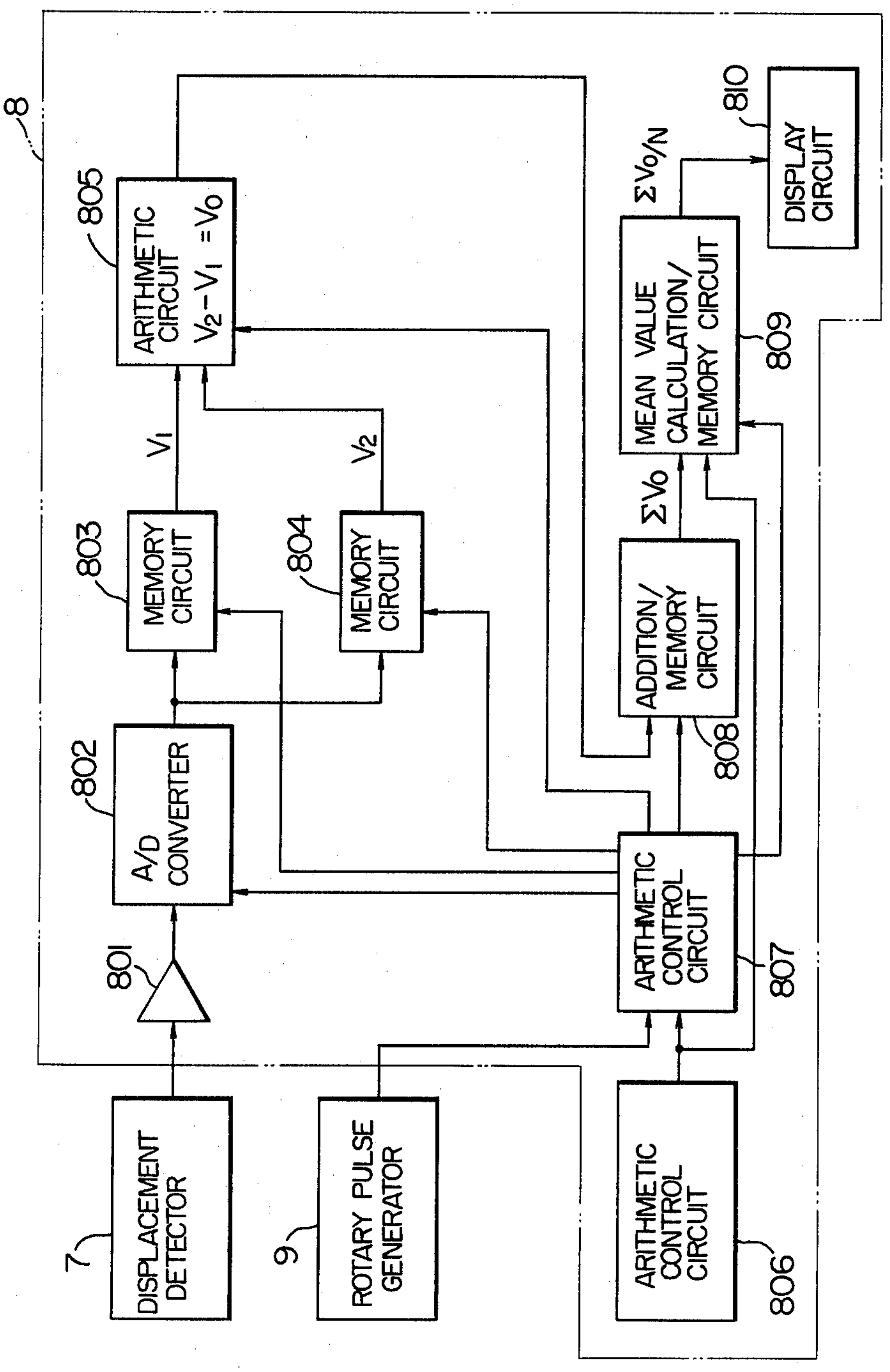
FIG. 3 is a block diagram illustrating an arrangement of an arithmetic unit 8 shown in FIG. 2.

A basic construction of the arithmetic unit 8 is illustrated in FIG. 3. In the figure, reference numeral 801 is an amplifier; 802 an analog/digital converter (abbreviated as A/D converter hereinafter); 803 and 804 memory circuits, 806 a circuit for manually setting the average number of injectings in a proper number from 1 to 9999; 807 an arithmetic control circuit; 808 an addition/memory circuit; 809 a mean calculation/memory circuit; 810 a display circuit.

Sequential steps of the method of measuring an injection amount of fuel oil, which can be executed by the apparatus as mentioned above, will be described with reference to FIGS. 4 and 5. The motor 100 of the prime mover 1, having the shafts 101 to 104, drives to rotate the cams 200a, 300 and 400a, and the rotary pulse generator 9. When the shaft rotating angle first reaches $\theta_1$, the cam 300 of the discharger 3 pushes up the tappet 301 to raise the valve 303 against resilient force of the spring 302. As a result, the valve 303 makes close contact with the valve seat 305 thereby to close the oil discharge path 304. When the rotational angle of the shafts 101 to 104 further progresses to $\theta_2$, the cam 400a of the pressure raising device 4 operates the injection pump 400 to inject the fuel oil into the injection chamber 5 from the injection nozzle through the injection pipe 401. Upon the injecting, pressure in the injection chamber rises to give pressure $P_A$ slightly higher than pressure $P_1$ (shown in FIG. 5) at which the piston 601 starts displacing, so that the piston 601 displaces. The process up to this is a measuring preparation step shown in FIG. 4.

Figure 4:
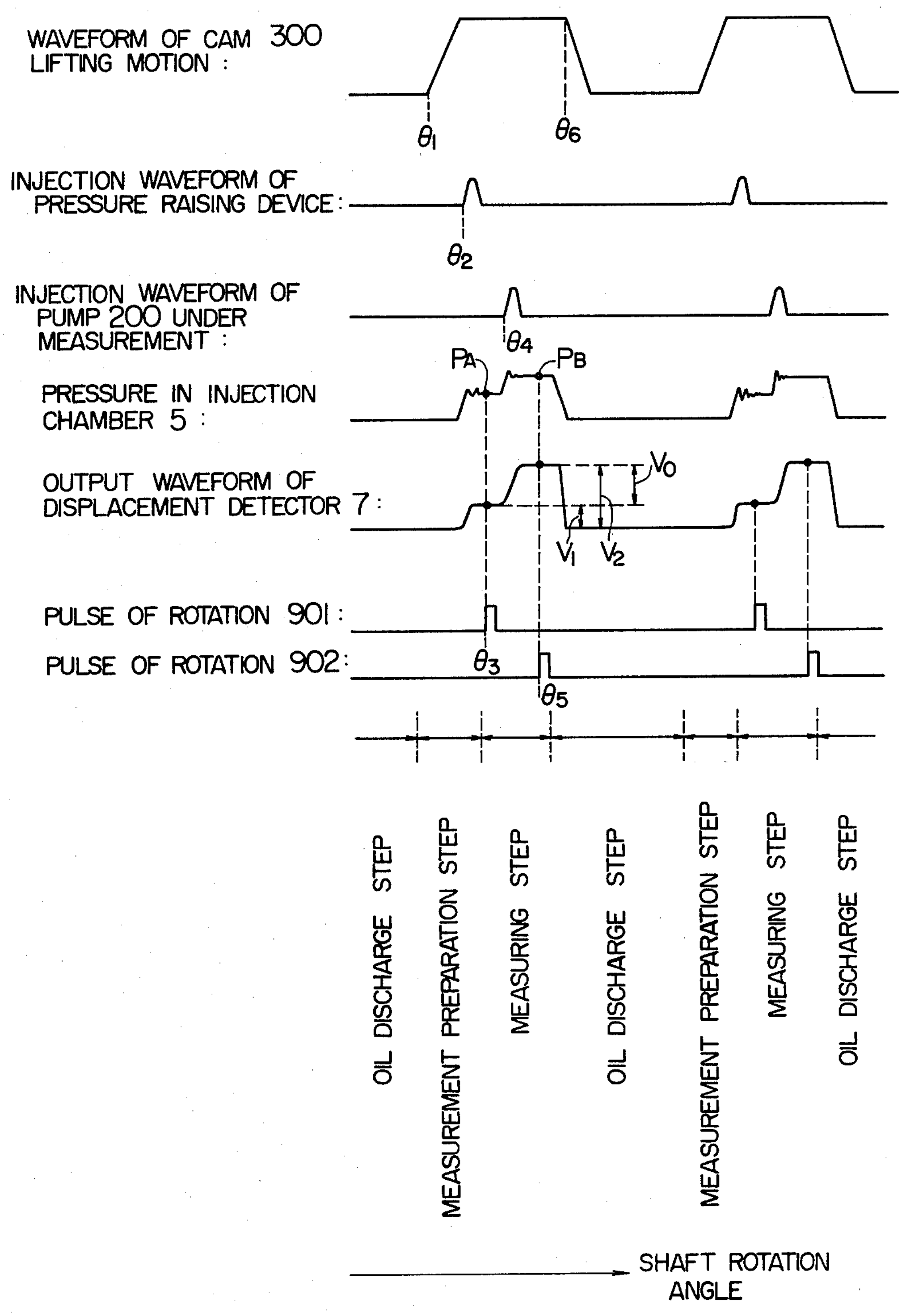
FIG. 4 illustrates waveforms at the respective portions useful in explaining the steps of a method of measuring an injection amount from an injection device according to the invention.

When the shaft rotating angle reaches $\theta_3$ shown in FIG. 4, the rotary pulse generator 9 generates rotation pulses 901 which are transferred to the arithmetic control circuit 807 of the arithmetic unit 8. At this time, the oil injection from the pressure raising device 4 causes the piston to displace and the displacement detector 7 to produce the output voltage $V_1$. The arithmetic control circuit 807 operates to store a digital signal representing the output voltage $V_1$ from the displacement detector 7 into the memory circuit 803 by means of the rotation pulses 901.

At $\theta_4$ of the rotation angle more slightly progressed than the $\theta_3$, the cam 200a operates the measured injection pump 200 to inject the fuel oil into the injection chamber 5, through the injection nozzle 203. As the result of the injecting of the oil from injection pump 200, the pressure in the injection chamber rises to pressure $P_B$ shown in FIGS. 4 and 5. With increase of the volume within the injection chamber 5, the piston 601 displaces and the displacement detector 7 produces an output voltage $V_2$. When the shaft rotation angle comes to $\theta_5$, the rotary pulse generator 9 generates rotation pulses 902 which in turn are inputted into the arithmetic control circuit 807 of the arithmetic unit 8. Upon receipt of the pulses, the arithmetic control circuit 807 operates to store into the memory circuit 804 a digital signal corresponding to the output voltage $V_2$. Then, the arithmetic circuit 805 calculates a difference $V_o$ between $V_2$ and $V_1(V_2-V_1=V_o)$ to find an injection amount of fuel oil per injecting and to apply the difference $V_o$ to the addition/memory circuit 808.

The process as mentioned above is a measuring step in FIG. 4.

Figure 5:
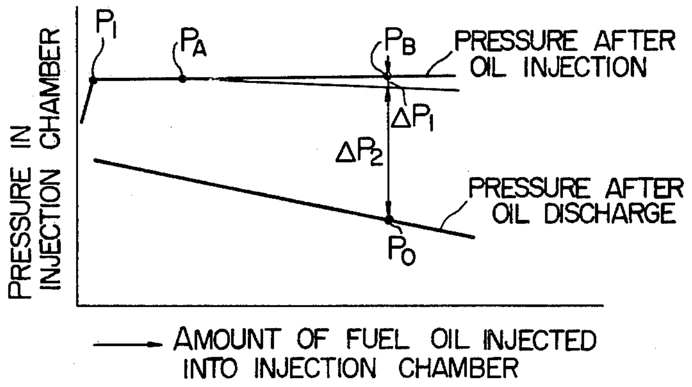
FIG. 5 is a graph illustrating a change of pressure in a injection chamber for explaining steps of the method of measuring an injection amount according to the invention.

The rotational angle of the shafts further progresses to $\theta_6$. At this moment, the cam 300 lifted starts descending, and the tappet 301 also descends. The force to lift the valve 303 of the spring 302 decreases to be smaller than the pressure in the injection chamber, the valve 303 moves off the valve seat 305 to open the discharge path 304. The fuel oil in the injection chamber 5 is discharged outside through the discharge path 304 to decrease the pressure in the injection chamber to the pressure after the oil discharge shown in FIG. 5. The above process is a discharge step shown in FIG. 4. Incidentally, the pressure in the injection chamber 5 after the oil is discharged decreases with increase of the fuel oil injection amount to the injection chamber 5, as shown in FIG. 5. When the pressure after the oil discharge is $P_o$, $\Delta P_2$ indicates an increased amount of the pressure caused by the oil injection from the pressure raising device 4, and $\Delta P_1$ indicates an increased amount of the pressure by the oil injection from the injection device 2.

The above-mentioned measuring preparation step, the measuring step, and the discharge step, making up one cycle of the process, are sequentially repeated, with the rotation of the shafts 101 to 104 of the prime mover 1. Each output $V_o$ of the arithmetic circuit 805 is repeatedly added by N times, which are set at by the circuit 806 for setting the average number of injectings, and the sum of the voltage $V_o$ is stored in the addition/memory circuit 808. The output of $\Sigma V_o$ from the addition/memory circuit 808 is stored in the mean calculation/memory circuit 809 and is divided by the number N to calculate the mean injection amount of fuel oil for the N-times of injectings. The mean injection amount of fuel oil is displayed by the display circuit 810 digitally.

The measurement preparation step and the measuring step in the sequence of the measuring process according to the present invention are essential to the present invention. Those will further be described in more detail. According to the measuring method of the invention, before the injecting of the measured injection pump 200, that is, in the measurement preparation process, an auxiliary injecting by the pressure raising device 4 is performed to raise the pressure, for example, $P_o = 10$ Kg/cm$^2$, within the injection chamber after the oil discharge to given pressure, for example, $P_A = 15$ Kg/cm$^2$. For this reason, at the time of the end of the injecting by the pressure raising device 4, the fuel oil, bubbles and the like in the injection chamber 5 have been satisfactorily compressed in their volume. The injecting from the injection pump 200 is performed after the contents filling the injection chamber 5 are thus satisfactorily volume-compressed. Therefore, in measuring the injection amount from the injection pump 200, there is eliminated a measuring error caused by the compressed volume of the contents previously filling the injection chamber 3, thus realizing high accuracy of the injection amount measurement per injecting.

An experiment of the measuring method of the present invention was conducted under a condition that a volume of the injection chamber 5 was 400 mm$^3$, the injection amount of the pressure raising device 4 was 10 mm$^3$, and the injection amount of the measured injection pump 200 changed within a range from 0 to 150 mm$^3$. In the experiment, the measuring error per injecting was within $\pm 0.5$ mm$^3$ and the injection amount can have been measured with high accuracy.

Figure 6:
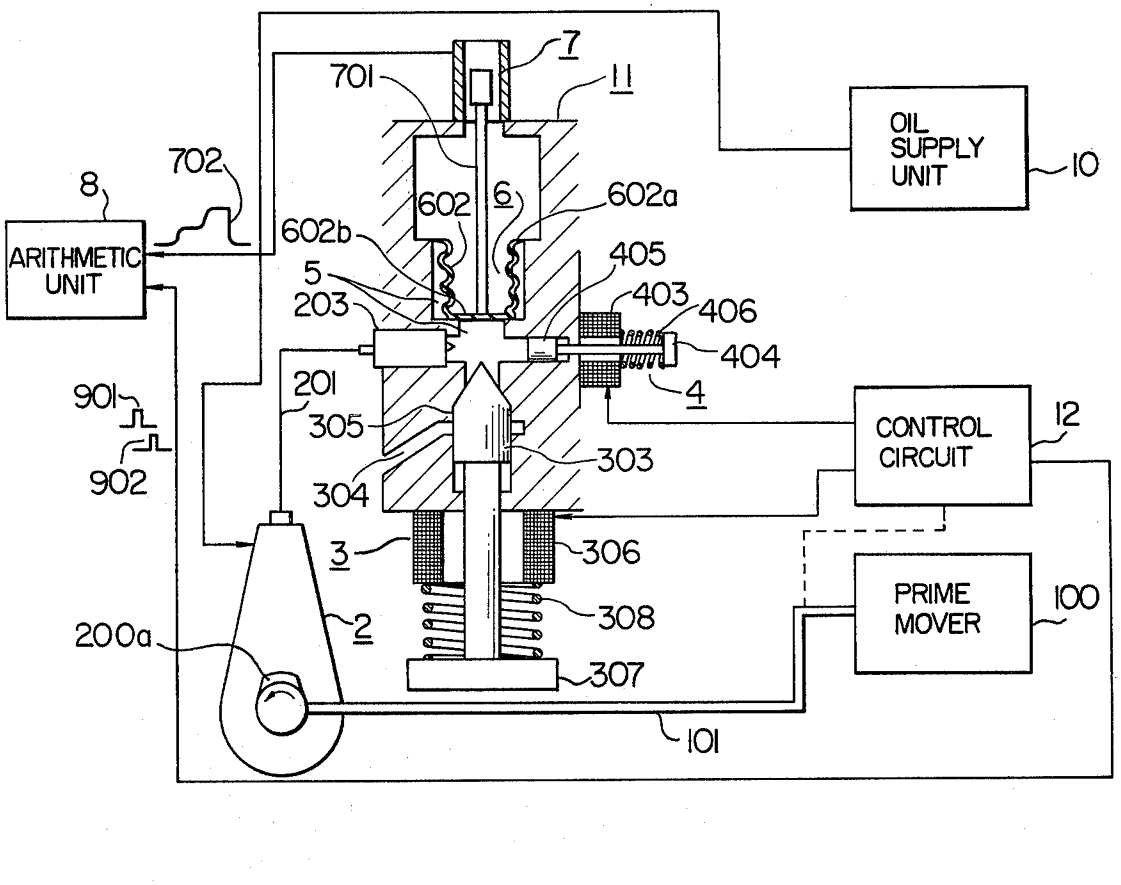
FIG. 6 is a cross sectional view of a major portion of another embodiment of the apparatus according to the invention.

Turning now to FIG. 6 there is shown another embodiment of an apparatus for measuring an injection amount from an injection device according to the present invention. In the present embodiment, the valve 303 in the discharger 3 is driven by an electromagnetic solenoid, with no need of the cam 300 and the tappet 301 used in the above-mentioned embodiment. Reference numeral 306 designates an exciting coil of an electromagnetic solenoid and numeral 307 is a plunger made of magnetic material attracted by the exciting coil 306, which is formed integral with the valve 303. A position shown of the plunger 307 shows the state in which it is attracted by the exciting coil 306. A spring 308 is for returning the plunger 307 to the original position.

The injection pump 400 in the previous embodiment is also omitted by using an electromagnetic solenoid for driving the pressure raising device 4. Numeral 403 designates an exciting coil of an electromagnetic solenoid and numeral 404 denotes a plunger made of magnet attracted by the exciting coil 403 formed integral with the piston 405. Numeral 406 is a plunger returning spring. When the exciting coil 403 is electrically excited, the plunger 404 is attracted against resilient force of the spring 406 and the piston 405 advances to raise pressure within the injection chamber.

In the present embodiment, the cam 300, the tappet 301, the injection pump 400 and the like are replaced by the electromagnetic member, as mentioned above. Therefore, a portion mechanically coupled with the injection device under measurement in the measuring apparatus of the invention is only the injection chamber 5. Accordingly, there is no need of the coupling by the shafts 101 to 104 as in the case of FIG. 2. The result is that a more flexibility in designing the measuring apparatus is ensured.

Further, bellows 602 are used as the displacement member 6, being connected at one end 602*a* to the main body 11 while connected at the other end of a free end 602*b* to the shaft 701 of the displacement detector 7. With this arrangement, the bellows 602 are displaced against the resilient force of the spring 602.

The embodiment shown in FIG. 6 is further designed so that a control circuit 12 for detecting a rotational angle of the shaft 101 of the prime mover 1 allows current to flow into the exciting coils 306 and 403 at during rotation angular interval $\theta_1 \sim \theta_6$ and $\theta_2 \sim \theta_6$, respectively and provide pulses 901 and 902 at angular positions $\theta_3$ and $\theta_5$, respectively.

As described above, the present invention could be embodied in various ways. Of course, the invention is applied for not only the measurement of an injection amount from an injection pump of the Diesel engine but also the measurement of an injection amount of liquid in various fields.

As seen from the foregoing description, the present invention minimizes the measuring error caused by the compressed volume of the contents filling the injection chamber, such as liquid and bubbles, and can make it feasible to precisely measure the injection amount of liquid per injecting.

According to the present invention the injection amount can be measured quickly without response delay and the measurement of single injecting can be readily executed.

I claim:

1. In an apparatus for measuring an injection amount from an injection device, said apparatus having,
   a body formed with a bore,
   a displacement member slidably disposed in said bore for defining an injection chamber into which a liquid is injected from said injection device, and
   a prime mover for driving said injection device,
   a measuring method for the injection amount comprising the steps of:
   (a) raising pressure of the liquid in said injection chamber to a predetermined value;
   (b) detecting a first position of said displacement member;
   (c) injecting a liquid into said injection chamber from said injection device under measurement so that said displacement member is displaced in accordance with the increased amount of the liquid within said injection chamber;
   (d) detecting a second position of said displacement member after said member is displaced; and
   (e) calculating the amount of the liquid injected from said injection device on the basis of the relative displacement of said displacement member between said first and second positions, wherein said raising step is carried out before each injection of the liquid from said injection device, and said predetermined value is equal to or slightly higher than a pressure at which said displacement member starts displacing before said injection step.

2. An apparatus for measuring an injection amount from an injection device, comprising:
   (a) an injection chamber into which a liquid is injected from the injection device;
   (b) a prime mover including a motor and a plurality of shafts;
   (c) pressure raising means responsive to a shaft rotation angle of said prime mover and for raising pressure within said injection chamber to predetermined pressure before said injecting step of the injection device;
   (d) discharger means responsive to the shaft rotation angle of said prime mover and for discharging a liquid within said injection chamber after completion of the injecting of said injection device;
   (e) a displacement member for causing displacement of a piston in accordance with a volume change within said injection chamber;

(f) a displacement detector for converting an amount of displacement of said piston into an electrical signal; and (g) an arithmetic unit for arithmetically processing said electrical signal from the displacement detector thereby to produce an injection amount of the liquid from said injection device.

3. An apparatus for measuring an injection amount from an injection device comprising:

(a) an injection chamber;

(b) a prime mover including a motor and four shafts;

(c) a discharger including a first cam, a tappet, a spring for holding said tappet, a valve, an oil discharge path, and a valve seat, said tappet sliding on said first cam which rotates with a first one of said shafts, for discharging fuel oil through said discharge oil path when said valve is departed from said valve seat;

(d) a pressure raising device including an injection pump, a discharge pipe and an injection nozzle, for preliminarily injecting fuel oil into said injection chamber after the valve of said discharger is set on said valve seat thereby to raise pressure within said injection chamber to predetermined pressure;

(e) a displacement member including a shaft and a piston with a step stopper, said piston being pushed down by said spring to make said step stopper abut on the end face of a piston hole;

(f) a displacement detector including a differential transformer for generating an electrical signal in accordance with a position of a movable iron core coupled to said piston of said displacement member by said shaft;

(g) a rotary pulse generator for generating pulse signals at two predetermined rotational positions of said four shafts; and (h) an arithmetic unit supplied with the electrical signal from said displacement detector and the pulse signals from said rotary pulse generator, for producing a digital signal representative of the injection amount of said injection device by performing a given arithmetic operation, whereby after the valve of said discharger closely comes into contact with said valve seat, fuel oil is injected from said pressure raising device thereby to displace said piston so that said displacement detector produces an output voltage $V_1$, and succeedingly fuel oil is injected from said injection device thereby to displace said piston so that said displacement detector produces an output voltage $V_2$, said arithmetic circuit unit digitally calculating a difference between the voltage $V_2$ and $V_1$ to produce a digital signal representative of an injection amount of fuel oil from said injection device per injecting (FIG. 2).

4. An apparatus for measuring an injection amount from an injection device, comprising:

(a) an injection chamber;

(b) a prime mover including a motor and two shafts;

(c) control circuit for detecting a rotational angle of a shaft of said prime mover;

(d) a discharger including a first electromagnetic solenoid and a piston in a unitary fashion;

(e) a pressure raising device including a second electromagnetic solenoid and a piston in a unitary fashion;

(f) a displacement member including bellows connected at one end to a main body of said apparatus;

(g) displacement detector including a shaft coupled at one end to said bellows and at the other end to a movable iron core, and a differential transformer for generating an electrical signal in accordance with a position of said movable core displaced by displacement of said bellows against a resilient force thereof by pressure within said injection chamber;

(h) a rotary pulse generator for generating pulse signals at given two rotational angles of said shaft; and (i) an arithmetic unit supplied with the electrical signal from said displacement detector and the pulse signals from said rotary pulse generator, for producing a digital signal representative of an injection amount of fuel oil by performing a given arithmetic operation, whereby when the bellows of said displacement member is displaced by preliminary injecting of fuel oil into said injection chamber from said pressure raising device, said displacement detector produces an output voltage $V_1$, and when the bellows of said displacement member is displaced by injecting of fuel oil into said injection chamber from said injection device, said displacement detector produces an output voltage $V_2$, said arithmetic unit calculating a difference $V_o$ between the output voltage $V_2$ and $V_1 (V_2 - V_1 = V_o)$, thereby to produce the injection amount of fuel oil from said injection device per injecting (FIG. 6).

* * * * *

UNITED STATES PATENT AND TRADEMARK OFFICE

CERTIFICATE OF CORRECTION

PATENT NO. : 4,391,133

DATED : July 5, 1983

INVENTOR(S) : Shinzo ITO

It is certified that error appears in the above-identified patent and that said Letters Patent is hereby corrected as shown below:

On the Title Page re Priority Data [Item 30]

DELETE: Mar. 30, 1979 [JP] ...Japan...54-38658

Signed and Sealed this

*Sixth* Day of *November 1984*

[SEAL]

*Attest:*

GERALD J. MOSSINGHOFF

*Attesting Officer* *Commissioner of Patents and Trademarks*